(12) United States Patent
Raglin et al.

(10) Patent No.: US 10,605,065 B1
(45) Date of Patent: Mar. 31, 2020

(54) FLUID AND GAS SEPARATOR

(71) Applicant: WellWorx Energy Solutions LLC, Horseshoe Bay, TX (US)

(72) Inventors: John M. Raglin, Fredericksburg, TX (US); Justin R. Ramirez, Odessa, TX (US); Dallas Barrett, Devon (CA)

(73) Assignee: WellWorx Energy Solutions LLC, Horseshoe Bay, TX (US)

( * ) Notice: Subject to any disclaimer, the term of this patent is extended or adjusted under 35 U.S.C. 154(b) by 0 days.

(21) Appl. No.: 16/251,813

(22) Filed: Jan. 18, 2019

(51) Int. Cl.
| | | |
|---|---|---|
| E21B 43/12 | (2006.01) | |
| E21B 43/38 | (2006.01) | |
| B01D 17/02 | (2006.01) | |
| B01D 19/00 | (2006.01) | |
| E21B 41/00 | (2006.01) | |

(52) U.S. Cl.
CPC ............ E21B 43/385 (2013.01); B01D 17/02 (2013.01); B01D 19/0042 (2013.01); E21B 43/127 (2013.01); E21B 43/128 (2013.01); E21B 41/0057 (2013.01)

(58) Field of Classification Search
CPC ...... E21B 43/127; E21B 43/128; E21B 43/38; E21B 43/385; B01D 17/02; B01D 19/0042
See application file for complete search history.

(56) References Cited

U.S. PATENT DOCUMENTS

| | | | | |
|---|---|---|---|---|
| 2,525,233 A * | 10/1950 | Miller | ..................... | E21B 43/38 166/105.5 |
| 2,883,940 A * | 4/1959 | Gibson | ................... | E21B 43/38 166/105.5 |
| 6,932,160 B2 * | 8/2005 | Murray | ................... | E21B 43/38 166/105.5 |
| 9,004,166 B2 * | 4/2015 | Raglin | .................. | E21B 43/127 166/105.5 |
| 9,022,106 B1 * | 5/2015 | McCoy | ................. | E21B 43/126 166/105.5 |
| 9,366,127 B1 * | 6/2016 | McCoy | ..................... | E21B 43/38 |
| 9,518,458 B2 * | 12/2016 | Ellithorp | ............... | E21B 43/127 |
| 9,670,758 B2 * | 6/2017 | Wilson | .................. | E21B 43/128 |
| 9,790,779 B2 * | 10/2017 | McCoy | ................... | E21B 43/38 |

* cited by examiner

*Primary Examiner* — Matthew R Buck
(74) *Attorney, Agent, or Firm* — Frost Brown Todd

(57) ABSTRACT

A separator for separating gas from a fluid mixture in a production stream of a well. The separator includes an outer tube and an inner tube positioned concentrically with the outer tube. The production stream is directed through the outer tube and into a space between a well casing of the well and the outer tube where gas in the production stream can separate from fluid in the production stream. The separated fluid is then directed through the inner tube to a pump.

18 Claims, 6 Drawing Sheets

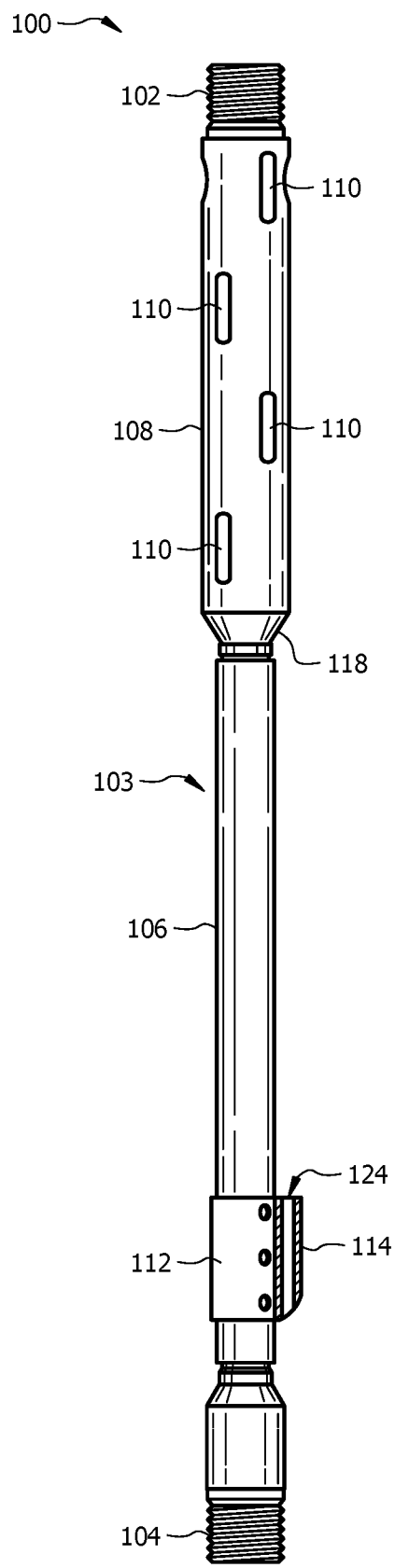
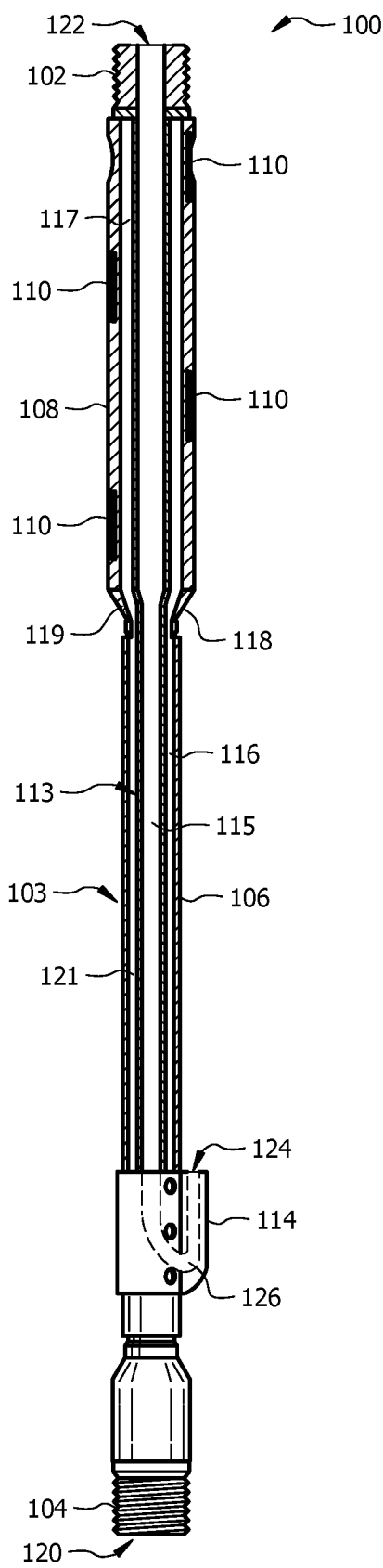
FIG. 4
FIG. 5

FLUID AND GAS SEPARATOR

TECHNICAL FIELD

The present disclosure is directed to an apparatus and method for petroleum producing and injection wells and more particularly to the separation of gas and liquid from a hydrocarbon production stream.

BACKGROUND OF THE INVENTION

Petroleum wells can be naturally flowing, injecting or can be produced by any means of artificial lift. Referring to FIG. 1, a diagram of a typical sucker rod pump used in oil wells is described. Well (10) may include a well bore (11) and a pump assembly (12). Pump assembly (12) may be formed by a motor (13) that supplies power to a gear box (14). Gear box (14) is operable to reduce the angular velocity produced by motor (13) and to increase the torque relative to the input of motor (13). The input of motor (13) may be used to turn crank (15) and lift counter weight (16). As crank (15) is connected to walking beam (17) via pitman arm (18), walking beam (17) may pivot and submerge plunger (19) in well bore (11) using bridle (20) connected to walking beam (18) by horse head (21). Walking beam (17) may be supported by sampson post (22).

As shown in FIGS. 1-2, well bore (11) may include casing (23) and tubing (24) extending inside casing (23). Sucker rod (25) may extend through the interior of tubing (24) to plunger (19). At the bottom of well bore (11), in oil bearing region (26), casing (23) may include perforations (27) that allow hydrocarbons and other material to enter annulus (28) between casing (23) and tubing (24). Gas may be permitted to separate from the liquid products and travel up the annulus where it is captured. Liquid well products may collect around pump barrel (29), which contains standing valve (30), as shown in FIGS. 3A-3B. Plunger (19) may include traveling valve (31). During the down stroke of the plunger (FIG. 3B), traveling valve (31) may be opened and product in the pump barrel (29) may be forced into the interior of tubing (24). When the pump begins its upstroke (FIG. 3A), traveling valve (31) may be closed and the material in the tubing may be forced up the tubing by the motion of plunger (19). Also, during the upstroke, standing valve (30) may be opened and material may flow from the annulus in the oil bearing region and into the pump barrel.

As can be seen from FIG. 1, where the product flowing into the well bore contains entrained and free gas, that gas can enter the pump and reduce the volumetric efficiency of the pump. For instance, the hydrocarbon production stream can include both liquid and gaseous products that are a natural byproduct of the producing wells. As hydrocarbons and water flow through the formation, gases can travel in the flow stream either separate from the liquid products or dissolved within the liquid products. The gases are carried into the production tubing and can cause problems with artificial lifting mechanisms, such as rod pumps, by reducing the volumetric efficiency of the pump.

Gas interference occurs in situations when the pump is filling with a considerable amount of free gas that is not separated before entering the pump. If the amount of free gas entering the pump can be reduced, the volumetric efficiency of the pump can be improved, or the total pump capacity can be increased.

BRIEF SUMMARY OF THE INVENTION

A separator for separating gas from a fluid mixture in a production stream in a producing hydrocarbon well is described. The separator may comprise an outer tube defining an outer conduit extending from a lower end to an upper end of the outer tube. The outer conduit may comprise a lower portion and an upper portion having a larger outer diameter than the lower portion. The outer conduit may comprise a bell portion extending outwardly between the lower portion and the upper portion. The separator may further comprise an inner tube positioned concentrically with the outer tube, the inner tube defining an inner conduit extending from a lower end to an upper end of the inner tube. The inner conduit may comprise a lower portion and an upper portion having a larger outer diameter than the lower portion. The inner conduit may comprise a bell portion extending outwardly between the lower portion and the upper portion.

A separator assembly for use within a well bore is described. The separator assembly may comprise a casing defining an annulus and a packer disposed within the annulus of the casing. A portion of the packer may be positioned adjacent to an interior surface of the casing. The separator assembly may further comprise a separator disposed within the annulus of the casing above the packer. The separator may comprise an outer tube and an inner tube positioned concentrically with the outer tube. The outer tube may define an outer conduit extending from a lower end to an upper end of the outer tube. The outer conduit may comprise a lower portion and an upper portion having a larger outer diameter than the lower portion. The outer conduit may comprise a bell portion extending outwardly between the lower portion and the upper portion. The inner tube may define an inner conduit extending from a lower end to an upper end of the inner tube. The inner conduit may comprise a lower portion and an upper portion having a larger outer diameter than the lower portion. The inner conduit may comprise a bell portion extending outwardly between the lower portion and the upper portion.

A method for separating gas from a fluid mixture in a production stream in a well is described. The method may comprise the steps of directing the production stream into an outer tube of a separator; reducing the fluid velocity of the production stream within the outer tube; directing the production stream out of the outer, tube into a space between a well casing of the well and the outer tube where gas in the production stream can separate from fluid in the production stream; directing the separated fluid of the production stream into an inner tube of the separator; reducing the fluid velocity of the separated fluid of the production stream within the inner tube; and drawing the separated fluid of the production stream through the inner tube.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawings, in which:

FIG. 4 depicts a perspective view of an exemplary embodiment of a gas separator for use within a petroleum producing well.

FIG. 5 depicts a cross-sectional view of the separator of FIG. 4.

DETAILED DESCRIPTION OF THE INVENTION

Figure 1:
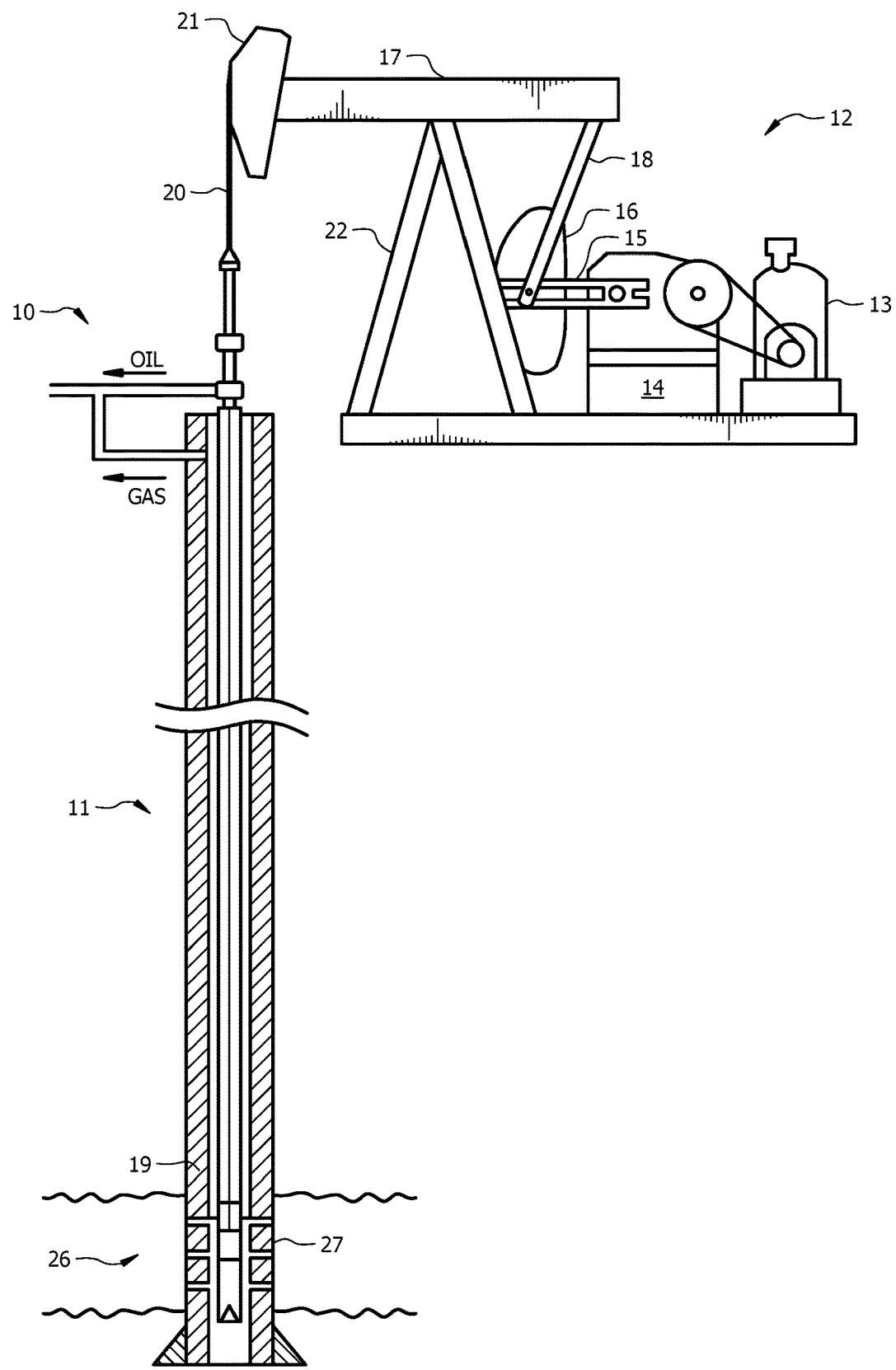
FIG. 1 depicts a diagram of a prior art petroleum producing well showing an existing sucker rod pump assembly to provide artificial lift.
Figure 2:
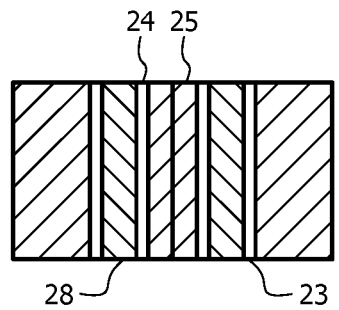
FIG. 2 depicts a sectional view of the well string shown in FIG. 1.
Figure 3A:
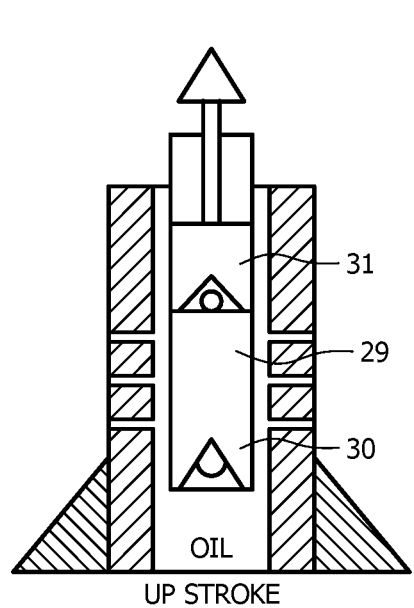
FIG. 3A depicts a detail view of the plunger portion of the well of FIG. 1 showing the up stroke.
Figure 3B:
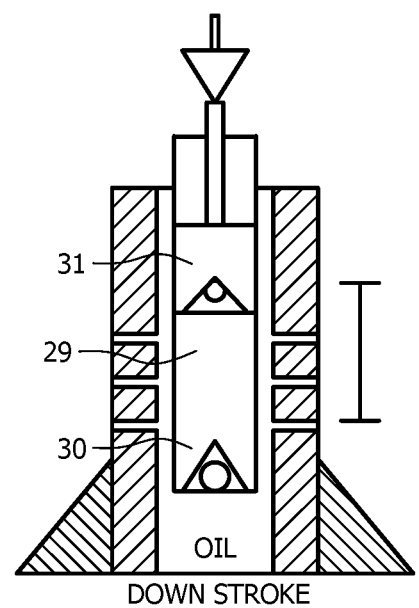
FIG. 3B depicts a detail view of the plunger portion of the well of FIG. 1 showing the down stroke.

A fluid and gas separator for a hydrocarbon producing well provides mechanisms for both reducing the amount of gas entrained in a liquid product, including oil and/or water, and separating that free gas from the liquid product. The mechanism uses a packer type separator to create an artificial sump for the pump. Any type of artificial lift applicable to any producing oil well may be used, such as a sucker rod pump, rod pumping, electric submersible pumps, progressive cavity, and other methods.

Referring now to FIGS. 4-5, a fluid and gas separator (100) is shown for use in a hydrocarbon producing well. The separator (100) comprises an outer tube (103) and an inner tube (113) positioned within the outer tube (103) such that the outer and inner tubes (103, 113) are concentrically aligned along a longitudinal axis. The outer tube (103) defines an outer conduit (121) extending from a lower end (120) of the separator (100) to an upper end (122) of the separator (100). A threaded portion (102, 104) may be provided on each of the lower and upper ends (120, 122). These threaded portions (102, 104) may be used to selectively couple the separator (100) with other tooling, as will be described in more detail below.

In the illustrated embodiment, the outer conduit (121) comprises a lower portion (106) and an upper portion (108), wherein the upper portion (108) has a larger diameter than the lower portion (106). A bell portion (118) is positioned between the upper portion (108) and the lower portion (106) of the outer conduit (121) such that the bell portion (118) forms a tapered wall extending outwardly between the lower and upper portions (106, 108). In some versions, the upper portion (108) may have an outer diameter of about 1.9 to 2.625 inches and the lower portion (106) may have an outer diameter of about 0.75 to 2. inches, but other suitable dimensions may be used as appropriate for the well bore. The separator (100) may also have a length of about 40 feet, but other suitable dimensions may be used, particularly standardized lengths for well bore tools. The outer tube (103) further comprises a plurality of slots (110) extending through the upper portion (108) from the outer conduit (121) to an exterior surface of the outer tube (103). In the illustrated embodiment, the slots (110) have a rectangular shape extending longitudinally along the upper portion (108), but any other suitable profiles may be used.

Figure 6:
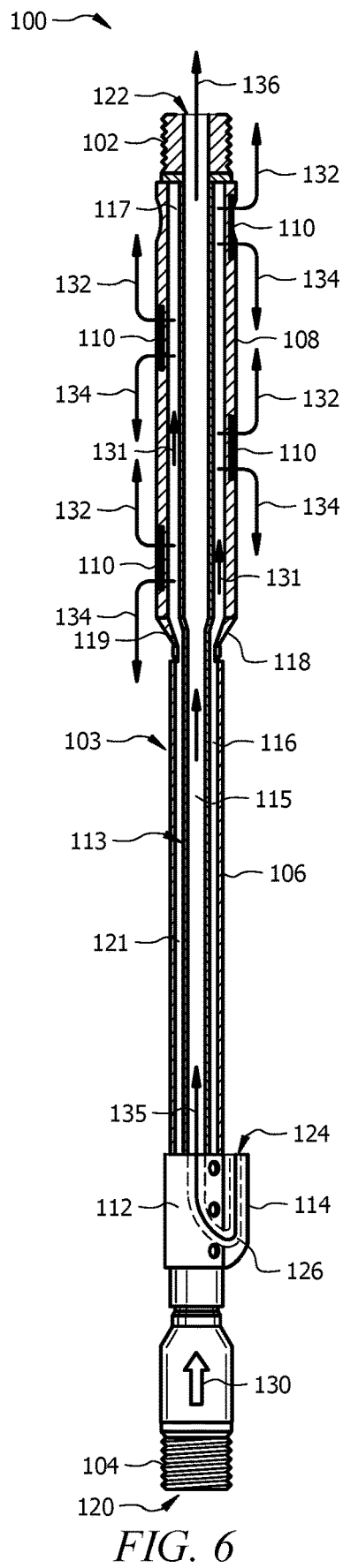
FIG. 6 depicts a cross-sectional view of the separator of FIG. 4 showing a flow path through the separator.
Figure 7:
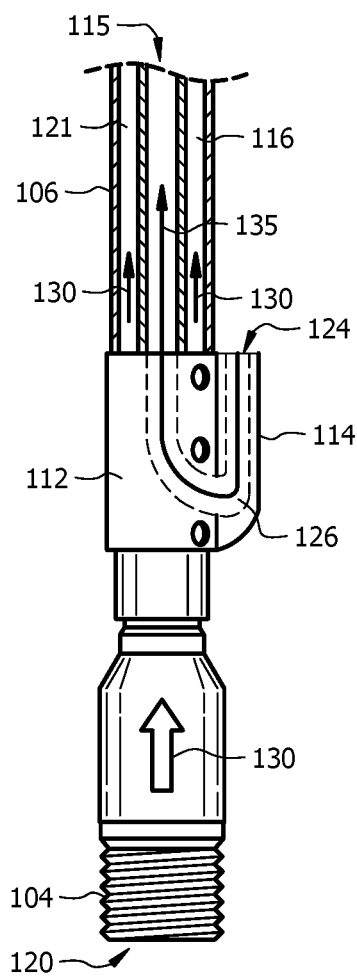
FIG. 7 depicts a detail view of the flow path of the separator in FIG. 6 at a bottom portion of the separator.
Figure 8:
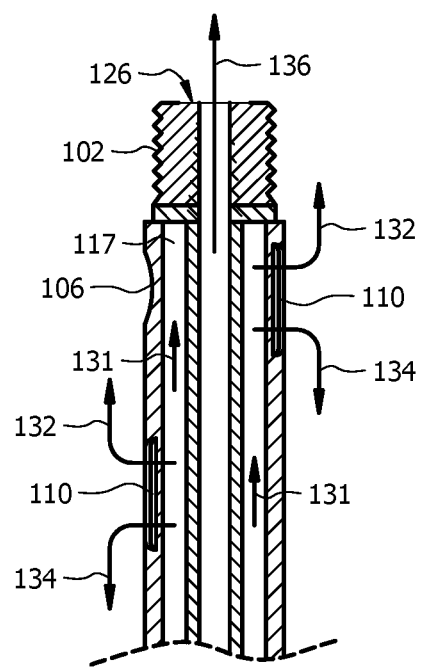
FIG. 8 depicts a detail view of the flow path of the separator in FIG. 6 at a top portion of the separator.

Referring to FIGS. 6-8, a fluid mixture including gas may enter the outer conduit (121) at the lower end (120) of the separator (100), as shown by arrows (130). The fluid and gas may then flow through the lower portion (106) of the outer conduit (121), through the bell portion (118), and up to the upper portion (108) of the outer conduit (121) by means of an artificial lift mechanism, as shown by arrows (131). As the fluid and gas passes through the bell portion (118) of the outer conduit (121), the velocity of the fluid and gas may decrease as it flows from the smaller diameter of the lower portion (106) to the larger diameter of the upper portion (108). The fluid and gas may then exit the outer conduit (121) through the plurality of slots (110). Accordingly, the bell portion (118) may aid in slowing the velocity of the fluid and gas to reduce turbulence as the fluid and gas exit through the slots (110). In some versions, the bell portion (118) is positioned about 35 feet above the lower end (120) of the separator (100). When the fluid and gas exit through the slots (110), to area between the outer tube (103) and a casing, the gas may be permitted to separate from the fluid mixture because the gas is less dense than the fluid mixture. Accordingly, the free gas may rise, as shown by arrows (132), where it may be captured before reaching the pump. The separated fluid mixture may then fall due to gravitational forces toward the lower end (120) of the separator (100), as shown by arrows (134).

The lower portion (106) of the outer tube (103) comprises a shroud (112) positioned adjacent to the lower end (120) of the outer tube (103) of the lower portion (106). The shroud (112) comprises a flange (114) extending outwardly from the outer tube (103) that defines an opening (124). As best seen in FIG. 5, the flange (114) is positioned such that the opening (124) extends downwardly through the flange (114), substantially parallel relative to the outer tube (103), to a lower opening (126) of the inner tube (113). The lower portion of the inner tube (113) may be curved outwardly to adjoin the opening (124) of the flange (114). Accordingly, the separated fluid may descend from the upper portion (108) of the outer tube (103) to the opening (124) of the flange (114) to enter the inner tube (113). The shroud (112) is thereby positioned to as a cup to capture the separated fluid and to cover the lower opening (126) of the inner tube (113) to prevent any leaked gas from entering the inner tube (113).

As best seen in FIGS. 5-6, the inner tube (113) defines an inner conduit (115) extending from the lower opening (126) of the inner tube (113) to the upper end (122) of the separator (100). In the illustrated embodiment, the inner conduit (115) comprises a lower portion (116) and an upper portion (117) corresponding to the outer conduit (121), wherein the upper portion (117) has a larger diameter than the lower portion (116). A bell portion (119) is positioned between the upper portion (117) and the lower portion (116) of the inner conduit (115) such that the bell portion (119) forms a tapered wall extending outwardly between the lower and upper portions (116, 117). In some versions, the upper portion (117) may have a diameter of about 1.9 to 2.625 inches and the lower portion (116) may have a diameter of about 0.75 to 1.3 inches, but other suitable dimensions may be used depending on well bore size and flow rates.

The separated fluid may collect in the opening (124) of the shroud (112) and enter the inner conduit (115) at the lower opening (126) of the inner tube (113), where the separated fluid may be redirected upward through the inner conduit (115) by means of an artificial lift mechanism, as shown by arrows (135). The separated fluid may then flow through the lower portion (116) of the inner conduit (115), through the bell portion (119), and up to the upper portion (117) of the inner conduit (115), shown by arrows (136). The separated fluid may then exit the inner conduit (115) through the opening at the upper end (122) of the separator (100), where it may be collected by the pump. As the separated fluid passes through the bell portion (119) of the inner conduit (115), the velocity of the separated fluid may decrease as it flows from the smaller diameter of the lower portion (116) to the larger diameter of the upper portion (117) to reduce emulsions prior to pump entry. The bell portion (119) of the inner conduit (115) may also be positioned at about 35 feet from the lower end (120) of the separator (100). Accordingly, the separator (100) may deliver fluid free of gas to the pump, which may improve the volumetric efficiency of the pump and/or increase the total pump capacity. Still other suitable configurations for the separator (100) will be apparent to one with ordinary skill in the art in view of the teachings herein.

Figure 9:
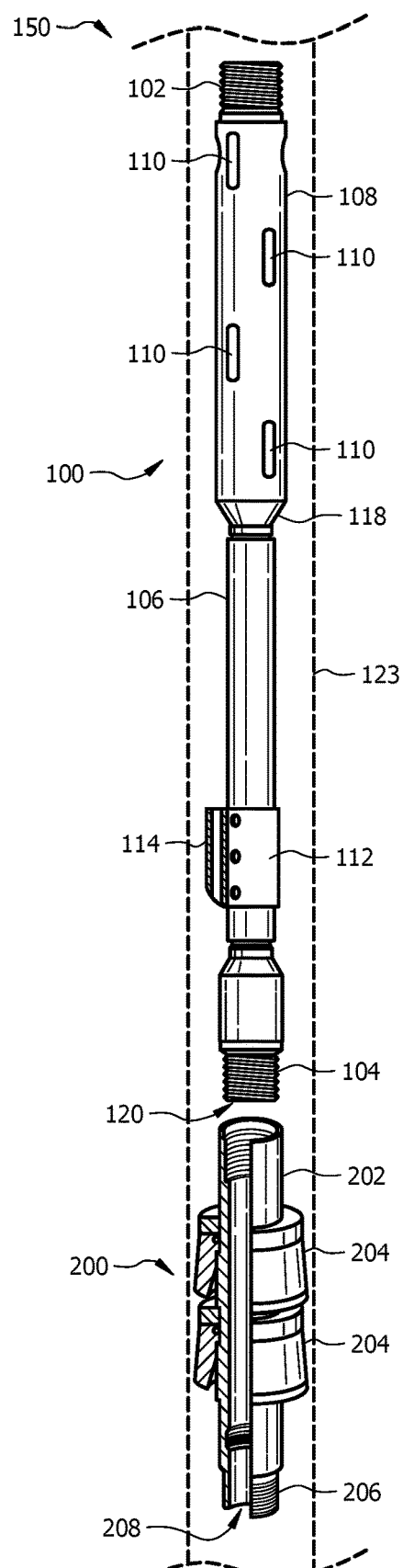
FIG. 9 depicts a diagram of an embodiment of a separator assembly comprising the separator of FIG. 4 assembled with a packer and disposed within a casing of a well bore.

A separator assembly (150) is shown in FIG. 9 comprising the separator (100) described above assembled with a packer (200) and disposed within a casing (123) of a well bore. For instance, the lower end (120) of the separator (100) may be coupled with a packer (200), such as by threadably coupling the threaded portion (104) of the separator (100) with the packer (200). This may prevent the packer (200) from getting stuck in the casing (123). In the illustrated embodiment, the packer (200) comprises a plurality of divertor cups (204) extending outwardly from a body (202) of the packer (200) to an interior surface of the casing (123). The cups (204) may thereby reduce or prevent any material from leaking around the exterior surface of the packer (200) to the separator (100). While two cups (204) are shown, any other suitable number of cups (204) may be used, such as four. A conduit (208) then extends through the body (202) of the packer (200). Fluid and gas may thereby flow from an oil-bearing region of the well-bore and through the conduit (208) of the packer (200). The packer (200) may thereby direct the production stream of the well to the separator (100).

The fluid and gas may then flow from the packer (200) into the outer conduit (121) of the outer tube (103) at the lower end (120) of the separator (100) by means of an artificial lift mechanism. The fluid and gas may flow through the lower portion (106) of the outer conduit (121), through the bell portion (118), and up to the upper portion (108) of the outer conduit (121). As the fluid and gas passes through the bell portion (118) of the outer conduit (121), the velocity of the fluid and gas may decrease as it flows from the smaller diameter of the lower portion (106) to the larger diameter of the upper portion (108). The fluid and gas may then exit the outer conduit (121) through the plurality of slots (110) in the upper portion (108) of the outer tube (103). When the fluid and gas exit the outer conduit (121), the gas may be permitted to rise in the area between the outer tube (103) and the casing (123) and the fluid may fall due to gravitational forces such that the gas is separated from the production stream. The separated fluid may then flow toward the lower end (120) of the separator (100).

The separated fluid may collect within opening (124) of the shroud (112) and may flow into the inner tube (113). The separated fluid may thereby enter the inner conduit (115) at the lower opening (126) of the inner tube (113), where the separated fluid may be redirected upward through the inner conduit (115) by means of an artificial lift mechanism. The separated fluid may then flow through the lower portion (116) of the inner conduit (115), through the bell portion (119), and up to the upper portion (117) of the inner conduit (115). As the separated fluid passes through the bell portion (119) of the inner conduit (115), the velocity of the separated fluid may decrease as it flows from the smaller diameter of the lower portion (116) to the larger diameter of the upper portion (117). The separated fluid may then exit the inner conduit (115) through the upper end (126) of the separator (100) to the pump. Still other suitable methods for operating the separator (100) will be apparent to one with ordinary skill in the art in view of the teachings herein.

Accordingly, the separator (100) allows the separated fluid to more efficiently flow to the pump. For instance, to provide a total fluid amount of about 400 through the pump in an about 4.5-inch diameter casing, the outer diameter of the lower portion (106) may provide a downward fluid velocity of about 0.4 and the outer diameter of the upper portion (108) may provide a downward fluid velocity of about 0.49 feet/second. To provide a total fluid amount of about 400 through the pump in an about 5.5-inch diameter casing, the outer diameter of the lower portion (106) may provide a downward fluid velocity of about 0.28 and the outer diameter of the upper portion (108) may provide a downward fluid velocity of about 0.32 feet/second. The smaller outer diameter of the lower portion (106) may also allow a user to maximize the annulus of the given well bore by increasing the size of the annulus, which may correlate to improved downward fluid velocities and provide a larger flow area to the pump for an improved efficiency of about 20 percent.

Figure 10:
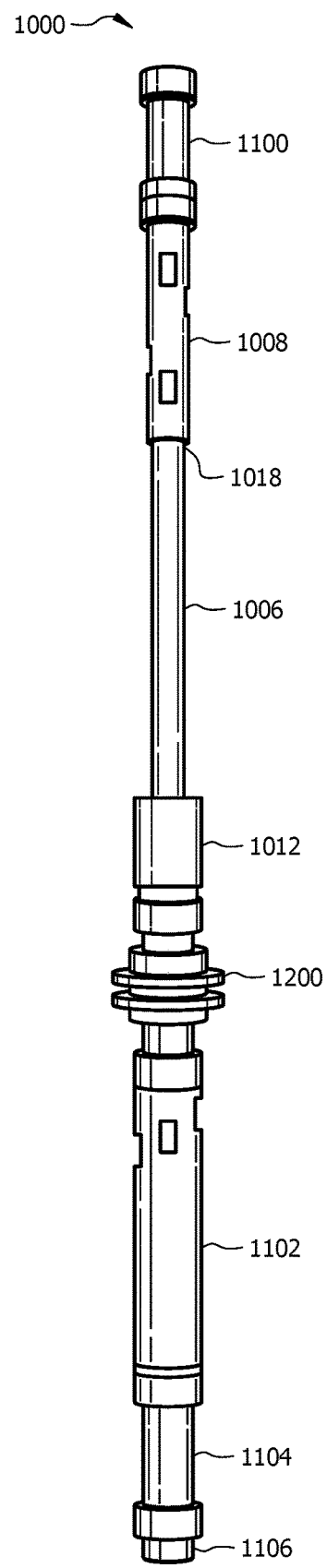
FIG. 10 depicts a diagram of a separator assembly employing an alternate shroud configuration and assembled with other exemplary tools.

Referring now to FIG. 10 an embodiment of a separator (1000) according to the concepts described herein is shown in relation to other string elements that may be employed with separator (1000). While a certain configuration is shown it is only illustrative of the types of configurations that may be used and is not intended to be limiting. The separator (1000) operates as described above with respect to FIG. 9. As described, separator includes upper portion 1008 and lower portion 1006 joined at bell portion (1018). The separator (1000) also illustrates an alternative shroud (1012) embodiment. Shroud (1012) surrounds the entire lower portion 1006, including the fluid intake (not shown). Shroud (1012 is sealed at the bottom but open at the top such that gas flowing up the well is directed by shroud (1012) around and away from the intake to lower portion (1006).

FIG. 10 further shows separator (1000) connected to seating nipple 1100 at the joint to allow connection to the well string or other downhole tools. Packer 1200 extends between separator (1000) and the inner surface of the casing as described. Below separator (1000) other tools may be connected, such as desander (1102) which is used to remove sand from the well fluid. Mud joints (1104) can be used collect sand removed from the well fluid and bull plug (1106 seals the bottom of the well string inside the casing.

While the present invention has been described with reference to a rod pumped well, the concepts described herein may be applied to any type of artificial lift system usable in any producing oil well, such as a sucker rod pump, rod pumping, electric submersible pumps, progressive cavity, and other methods.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A separator for use within a well bore, the separator comprising:
    an outer tube defining an outer conduit extending from a lower end to an upper end of the outer tube, wherein the outer conduit comprises a lower portion and an upper portion having a larger outer diameter than the lower portion, wherein the outer conduit comprises a bell portion extending outwardly between the lower portion and the upper portion;
    an inner tube positioned concentrically with the outer tube, wherein the inner tube defines an inner conduit extending from an intake at a lower end of the inner tube to an upper end of the inner tube, wherein the inner conduit comprises a lower portion and an upper portion having a larger outer diameter than the lower portion, wherein the inner conduit comprises a bell portion extending outwardly between the lower portion and the upper portion, wherein the intake provides a flow path to the inner tube from outside the outer tube; and
    a shroud positioned about the outer tube adjacent to the lower end of the outer tube, wherein the shroud covers the intake and prevents gasses from entering the intake from below.

2. The separator of claim 1, wherein the outer tube comprises a plurality of slots extending from the upper portion of the outer conduit to an exterior surface of the outer tube.

3. The separator of claim 2, wherein a lower end of the outer conduit is open to receive a fluid mixture including gas, allowing the fluid mixture to flow from the lower end of the outer conduit to the plurality of slots, the plurality of slots assisting in separating the gas from the fluid mixture when the fluid mixture exits through the plurality of slots.

4. The separator of claim 3, wherein the larger outer diameter of the upper portion of the outer conduit defines a larger flow area in the upper portion relative to the lower portion, allowing the fluid velocity of the fluid mixture to decrease when the fluid mixture flows from the lower portion to the upper portion of the outer conduit.

5. The separator of claim 3, wherein a lower end of the inner conduit is open at the intake to receive the separated fluid, allowing the separated fluid to pass through the intake and flow from the lower end of the inner conduit to an upper end of the inner conduit.

6. The separator of claim 5, wherein the larger outer diameter of the upper portion of the inner conduit defines a larger flow area in the upper portion relative to the lower portion, allowing the fluid velocity of the separated fluid to decrease when the separated fluid flows from the lower portion to the upper portion of the inner conduit.

7. The separator of claim 1, wherein an opening of the shroud is positioned upward to collect separated fluid exiting from the outer tube.

8. The separator of claim 1, wherein the lower end and the upper end of the outer tube each comprise a threaded portion.

9. The separator of claim 1, wherein the lower end of the outer tube is couplable with a packer.

10. The separator of claim 1, wherein the separator is positionable within a casing of a well bore.

11. A separator assembly for use within a well bore, the separator assembly comprising:
    a casing defining an annulus;
    a packer disposed within the annulus of the casing, wherein a portion of the packer is positioned adjacent to an interior surface of the casing; and
    a separator disposed within the annulus of the casing above the packer, wherein the separator comprises:
        an outer tube defining an outer conduit extending from a lower end to an upper end of the outer tube, wherein the outer conduit comprises a lower portion and an upper portion having a larger outer diameter than the lower portion, wherein the outer conduit comprises a bell portion extending outwardly between the lower portion and the upper portion, and where the outer tube further comprises a shroud positioned about the outer tube adjacent to the lower end of the outer tube, wherein the shroud is sealed at a bottom end and open at a top end and covers an intake to the separator; and
        an inner tube positioned concentrically with the outer tube, wherein the inner tube defines an inner conduit extending from the intake at a lower end of the inner tube to an upper end of the inner tube, wherein the inner conduit comprises a lower portion and an upper portion having a larger outer diameter than the lower portion, wherein the inner conduit comprises a bell portion extending outwardly between the lower portion and the upper portion.

12. A method for separating gas from fluid in a production stream in a well, the method comprising the steps of:
    directing the production stream into a lower end of an outer tube of a separator;
    reducing the fluid velocity of the production stream within the outer tube;
    directing the production stream out of an upper end of the outer tube into a space between a well casing of the well and the outer tube where gas in the production stream can separate from fluid in the production stream;
    directing the separated fluid of the production stream into an intake at a lower end of an inner tube of the separator through a shroud positioned about the outer tube adjacent to the lower end of the outer tube covering the intake to the inner tube;
    reducing the fluid velocity of the separated fluid of the production stream within the inner tube; and drawing the separated fluid of the production stream through the inner tube.

13. The method of claim 12, further comprising delivering the separated fluid of the production stream from the inner tube to a pump.

14. The method of claim 12, further comprising using a packer to direct the production stream into the separator.

15. The method of claim 14, wherein the shroud prevents any gas leaked around the packer from entering the inner tube.

16. The method of claim 12, wherein the shroud has an opening directed upward and prevents well gasses from entering the inner tube.

17. The method of claim 12, wherein reducing the fluid velocity of the production stream within the outer tube comprises increasing an outer diameter of the outer tube to thereby increase the flow area of the outer tube.

18. The method of claim 12, wherein reducing the fluid velocity of the separated fluid of the production stream within the inner tube comprises increasing an outer diameter of the inner tube to thereby increase the flow area of the inner tube.

\* \* \* \* \*